(12) United States Patent
Paick et al.

(10) Patent No.: US 8,915,324 B2
(45) Date of Patent: Dec. 23, 2014

(54) ELECTRIC BICYCLE AND CONTROL METHOD THEREOF

(71) Applicant: Mando Corporation, Gyeonggi-do (KR)

(72) Inventors: In Ha Paick, Seoul (KR); Jae Hyung Chun, Yongin-si (KR)

(73) Assignee: Mando Corporation, Pyeongtaek-Si (KR)

( * ) Notice: Subject to any disclaimer, the term of this patent is extended or adjusted under 35 U.S.C. 154(b) by 0 days.

(21) Appl. No.: 13/682,622

(22) Filed: Nov. 20, 2012

(65) Prior Publication Data
US 2014/0080661 A1   Mar. 20, 2014

(51) Int. Cl.
*B60W 10/08*   (2006.01)
*B62M 6/40*   (2010.01)

(52) U.S. Cl.
CPC ............. *B60W 10/08* (2013.01); *B62M 6/40* (2013.01); *Y02T 10/7005* (2013.01)
USPC ......................... 180/220; 180/219; 318/452

(58) Field of Classification Search
CPC ...... B62M 6/40; Y02T 10/7005; B60W 10/08
USPC ............... 180/220, 205, 206, 207, 65.2, 219; 280/214, 212, 452, 124.166, 124.169; 318/452, 139, 461
See application file for complete search history.

(56) References Cited

U.S. PATENT DOCUMENTS

| 5,836,414 A | * | 11/1998 | Seto et al. ................. 180/206.1 |
| 5,938,224 A | * | 8/1999 | Brackett ...................... 280/216 |
| 6,573,686 B2 | * | 6/2003 | Uno .............................. 320/123 |

FOREIGN PATENT DOCUMENTS

| WO | 00/59773 A2 | 10/2000 |
| WO | 2011/081359 A2 | 7/2011 |

OTHER PUBLICATIONS

Extended European Search Report issued in European Patent Application No. EP 12190245.6 dated Dec. 17, 2013.

* cited by examiner

*Primary Examiner* — Joseph M Rocca
*Assistant Examiner* — Jacob Knutson
(74) *Attorney, Agent, or Firm* — McDermott Will & Emery LLP

(57) ABSTRACT

An electric bicycle and a control method thereof are disclosed. The disclosed electric bicycle includes a direction sensor to sense a rotation direction of pedals, a pedal load controller to adjust a load applied to the pedals, and an electronic control unit to release the load applied to the pedals through the pedal load controller when the sensed rotation direction is a reverse direction.

4 Claims, 10 Drawing Sheets

ELECTRIC BICYCLE AND CONTROL METHOD THEREOF

CROSS-REFERENCE TO RELATED APPLICATIONS

This application claims the benefit of Korean Patent Application No. P2012-104230, filed on Sep. 19, 2012 in the Korean Intellectual Property Office, the disclosure of which is incorporated herein by reference.

BACKGROUND

1. Field

Embodiments of the present invention relate to an electric bicycle having no chain to connect pedals and wheels, and a control method thereof.

2. Description of the Related Art

Generally, electric bicycles include a motor to rotate wheels and a battery to supply electric power to the motor. Such an electric bicycle travels in accordance with rotation of the wheels by the motor. Charging of the battery is carried out when a generator connected to the pedals is operated in accordance with rotation of pedals.

In a traditional bicycle, traveling thereof is basically achieved by pedaling. A chain is employed to transmit pedaling force from the user to wheels.

However, such a chain has a complex structure, and occupies a large area in the bicycle. Furthermore, the chain may be separated from the wheels. In addition, the skirt of a user may be caught by the chain or may be contaminated by the chain.

In order to solve such problems, an electric bicycle having no chain has recently been developed.

In such a chain-free electric bicycle, the motor thereof rotates when a button disposed on a handle is depressed, thereby causing the bicycle to move forward.

In the chain-free electric bicycle, pedal load is applied to the user when the user pedals and, as such, the user feels pedaling sensation when pedaling, as in the case in which there is a chain.

In conventional cases, application of the pedal load is carried out irrespective of the rotation direction of the pedals. For this reason, it is possible to rotate the pedals in a normal direction only when the user strongly pedals, whereas it is possible to rotate the pedals in a reverse direction only when the user strongly lifts the pedals by the tops of the feet. Here, the "normal direction" means a rotation direction of the pedals to move the bicycle forward, whereas the "reverse direction" means an opposite direction to the normal direction.

However, since pedal load is applied irrespective of the rotation direction of the pedals in such a conventional case, the pedal load is applied even when the pedals are reversely rotated. For this reason, for example, when the user pedals to reversely rotate the pedals such that each pedal moves to a start position, great force is required to reversely rotate the pedals. This may cause user inconvenience.

SUMMARY

Therefore, it is an aspect of the present invention to provide an electric bicycle capable of releasing pedal load when pedals rotate in a reverse direction, thereby eliminating inconvenience occurring upon rotating the pedals in the reverse direction.

Another aspect of the present invention is to provide an electric bicycle in which pedal load is applied when the rotation direction of pedals is a normal direction, whereas the pedal load is released when the rotation direction of the pedals is a reverse direction, thereby being capable of enabling the user to feel pedaling sensation while eliminating inconvenience occurring upon rotating the pedals in the reverse direction.

Additional aspects of the invention will be set forth in part in the description which follows and, in part, will be obvious from the description, or may be learned by practice of the invention.

In accordance with one aspect of the present invention, an electric bicycle includes a direction sensor to sense a rotation direction of pedals, a pedal load controller to adjust a load applied to the pedals, and an electronic control unit to release the load applied to the pedals through the pedal load controller when the sensed rotation direction is a reverse direction.

The electronic control unit may apply the load to the pedals when the sensed rotation direction is a normal direction.

The pedal load controller may include a generator to generate AC power in accordance with driving of the pedals, a rectifier to rectify the AC power generated from the generator into DC power, a smoothing circuit to charge the DC power output from the rectifier so as to smooth the output power, and a switch connected in series between the generator and a battery to be charged with the power smoothed by the smoothing circuit.

The electronic control unit may perform pulse width modulation (PWM) control to turn on or off the switch when the sensed rotation direction of the pedals is a normal direction, to charge the battery with the power generated from the generator.

The electronic control unit may turn off the switch when the sensed rotation direction of the pedals is a reverse direction, to open output terminals of the generator.

The electric bicycle may further include a speed sensor to sense a speed of the electric bicycle. Under a condition that the speed sensed by the speed sensor is equal to or lower than a predetermined speed, the electronic control unit may apply the load to the pedals through the pedal load controller when the sensed rotation direction is a normal direction, while releasing the load applied to the pedals by the pedal load controller when the sensed rotation direction is a normal direction.

In accordance with another aspect of the present invention, a control method of an electric bicycle includes sensing a rotation direction of pedals, and applying a load to the pedals when the sensed rotation direction is a normal direction, and releasing the load applied to the pedals when the sensed rotation direction is a reverse direction.

The control method may further include sensing a speed of the electric bicycle, and applying the load to the pedals when the sensed rotation direction is a normal direction, while releasing the load applied to the pedals by the pedal load controller when the sensed rotation direction is a normal direction, under a condition that the speed sensed by the speed sensor is equal to or lower than a predetermined speed.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
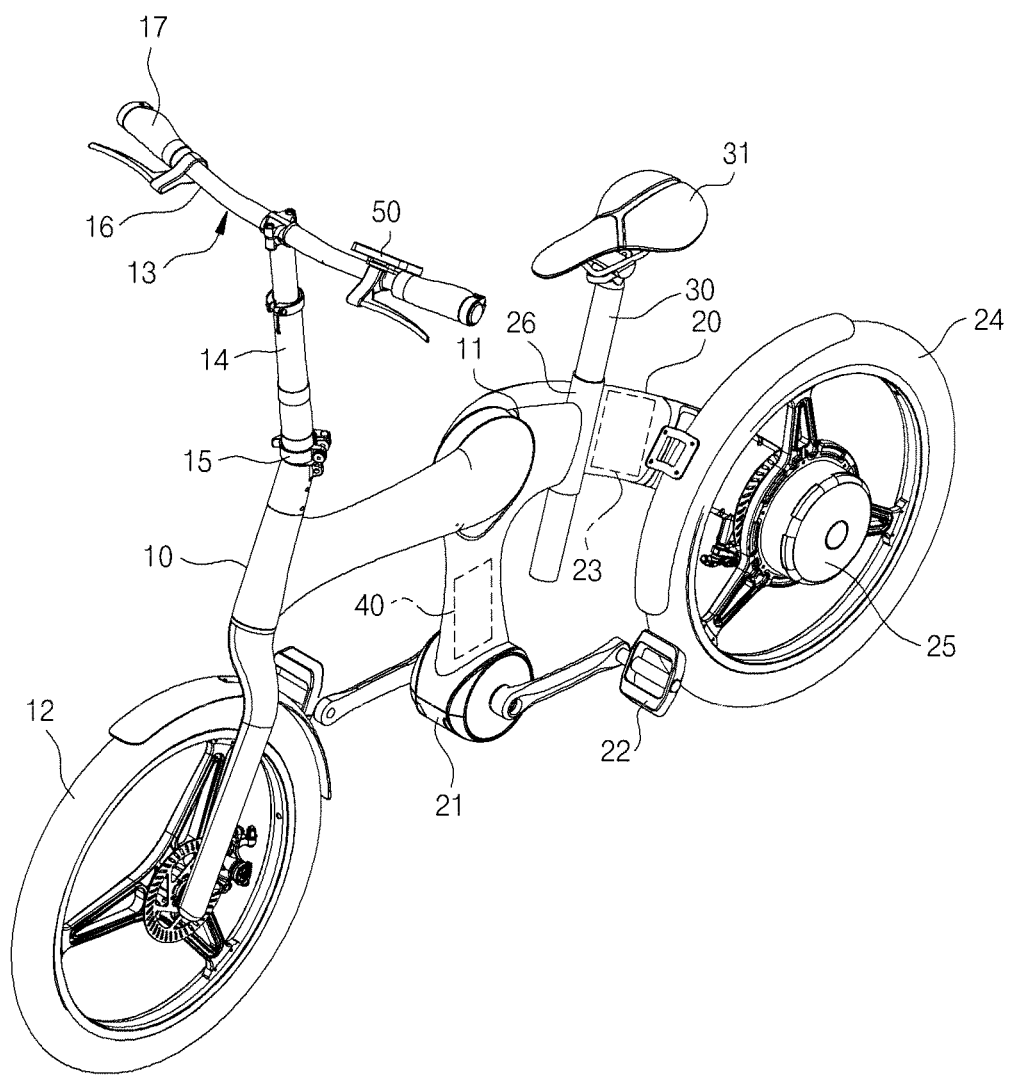
FIG. 1 is a perspective view illustrating an electric bicycle according to an exemplary embodiment of the present invention.

Reference will now be made in detail to the preferred embodiments of the present invention, examples of which are illustrated in the accompanying drawings. These embodiments are provided so that this disclosure will be thorough and complete, and will fully convey the spirit and scope of the present invention to those skilled in the art. Other embodiments may also be provided. Constituent elements other than elements constituting essential features of the present invention may be omitted from the drawings, for clarity of description. In the drawings, the widths, lengths, and thicknesses of constituent elements may be exaggerated for clarity and convenience of illustration. Like reference numerals refer to like elements throughout.

FIG. 1 is a perspective view illustrating an electric bicycle according to an exemplary embodiment of the present invention.

Referring to FIG. 1, the electric bicycle includes a front frame 10, a rear frame 20, and a saddle frame 30.

The front frame 10 and rear frame 20 are pivotally coupled to a hinge plate 11 by a hinge shaft. The hinge plate 11 is installed to be pivotable about the hinge shaft in forward and rearward directions.

A handle stay 14 is coupled to one end of the front frame 10. A front wheel 12 and a handle 13 are connected to the handle stay 14.

The handle 13 includes a handle stem 15 coupled to a lower end of the handle stay 14, a handle bar 16 coupled to the handle stay 14, and handle grips 17 respectively fitted around opposite ends of the handle bar 16.

The handle stem 15 is provided to adjust the level of the handle 13. The handle bar 16 is provided to steer the electric bicycle. An interface device 50 is provide at one of the handle grip 17, not only to display a state of the electric bicycle to the user, but also to transmit a command from the user to an electronic control unit 40, which will be described later. The interface device 50 is electrically connected to the electronic control unit 40.

The front wheel 12 is rotatably coupled to the lower end of the handle stay 14 at one side of the handle stay 14. In accordance with an embodiment of the present invention, the front wheel 12 may be coupled to the lower end of the handle stay 14 at a right side of the handle stay 14 when viewed from a rear side of the electric bicycle. Alternatively, the handle stay 14 may have a fork shape, and the front wheel 12 may be mounted to the fork-shaped handle stay 14, as in a traditional bicycle.

A generator 21 is provided at one end of the rear frame 20. Pedals 22 are rotatably mounted to opposite sides of the generator 21. When the pedals 22 are rotated, rotating force is generated from the pedals 22, and is converted into electrical energy by the generator 21. The electrical energy from the generator 21 may be accumulated in a battery 23, which will be described later.

A rear wheel 24 is rotatably mounted to the other end of the rear frame 20 at a left side of the rear frame 20. Although not shown, the rear frame 20 may have a fork shape, and the rear frame 20 may be mounted to the fork-shaped rear frame 20, as in a traditional bicycle.

A motor 25 is mounted to the rear wheel 24, to rotate the rear wheel 24, and thus to move the bicycle forward. A speed changer may be mounted to the motor 25 in order to change a rotation speed of the rear wheel 24 in accordance with user operation of the interface device 50.

The battery 23, which accumulates electrical energy from the generator 21, may be mounted in the rear frame 20, together with the electronic control unit 40. The battery 23 may also be mounted in the front frame 10.

The rear frame 20 is coupled, at one side thereof, to a rear portion of a seat tube 26. The rear frame 20 and seat tube 26 may be integrated.

The saddle frame 30 is coupled to the rear frame 20. A saddle 31, on which the user will sit, is mounted to one end of the saddle frame 30.

Figure 2:
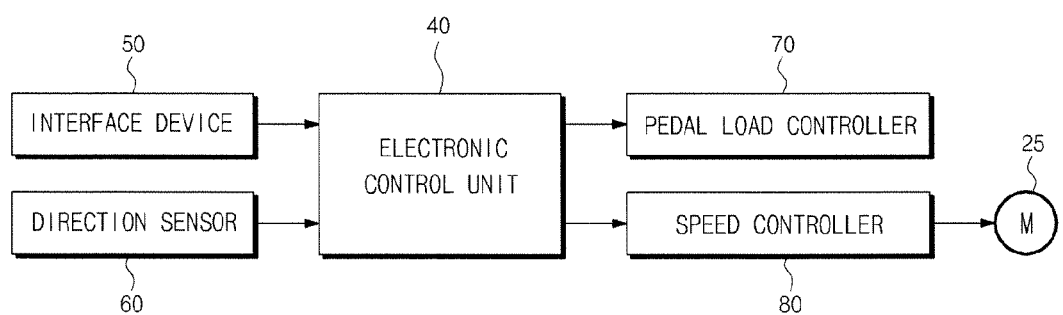
FIG. 2 is a block diagram illustrating a control configuration of the electric bicycle according to an embodiment of the present invention.

FIG. 2 is a block diagram illustrating a control configuration of the electric bicycle according to an embodiment of the present invention.

Referring to FIG. 2, the electric bicycle includes the electronic control unit 40, the interface device 50, a direction sensor 60, a pedal load controller 70, and a speed controller 80.

The interface device 50 not only displays a state of the electric bicycle to the user, but also transmits a command input by the user via the button to the electronic control unit 40.

The direction sensor 60 is provided at one side of the rear frame 20, to sense a rotation direction of the pedals 22.

The direction sensor 60 may sense not only the rotation direction of the pedals 22, but also the rotation speed of the pedals 22. The direction sensor 60 may include a Hall sensor, to sense the rotation direction and rotation speed of the pedals 22. The Hall sensor is a sensor employing a Hall element exhibiting electric current-magnetic effects that a variation in output occurs when a magnetic field is applied in a direction perpendicular to a current flow direction. The Hall sensor is a semiconductor sensor frequently used to check the rotation direction, rotation angle or RPM of a shaft. It may be possible to sense whether the rotation direction of the pedals 22 is a normal direction or a reverse direction, by sensing the rotation direction of a pedal shaft by use of the Hall sensor as described above.

The pedal load controller 70 adjusts a load applied to the pedals 22. In accordance with adjustment of the load applied to the pedals 22 by the pedal load controller 70, the user may feel pedaling sensation when pedaling the pedals 22 as if there is a chain. If necessary, it may be possible to prevent the user from feeling pedaling sensation.

The pedal load controller 70 may adjust the pedal load of the pedals 22 by, for example, adjusting the amount of electric power charged in the battery 23 after being generated from the generator 21 in accordance with driving of the pedals 22.

Figure 3:
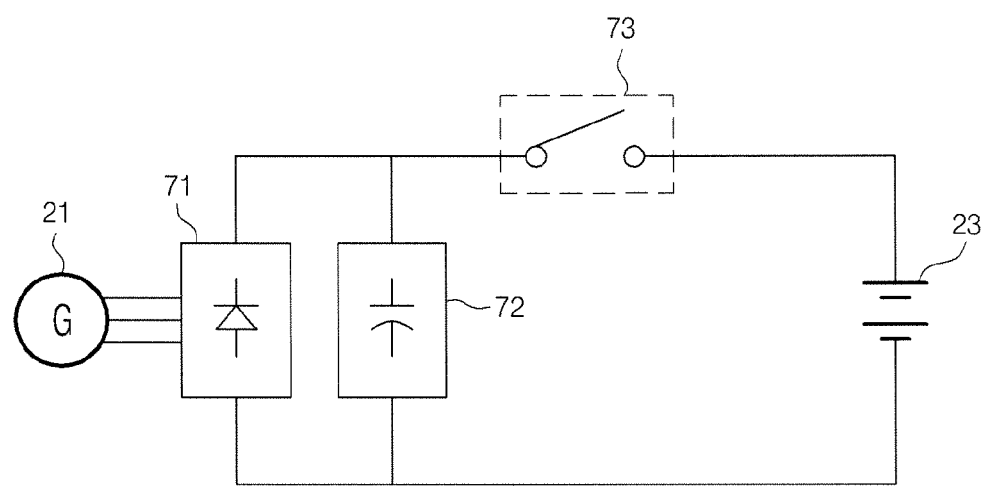
FIG. 3 is a circuit diagram explaining a configuration of a pedal load controller in the electric bicycle according to an embodiment of the present invention.

FIG. 3 is a circuit diagram explaining a configuration of the pedal load controller in the electric bicycle according to an embodiment of the present invention.

Referring to FIG. 3, the pedal load controller 70 includes the generator 21, which generates AC power in accordance with driving of the pedals 22, a rectifier 71 to rectify the AC power generated from the generator 21 into DC power, and a smoothing circuit 72 to smooth an output voltage from the rectifier 71 through charging. The pedal load controller 70 also includes a switch 73 connected in series between the battery 23 and the generator 21.

The pedal load controller 70 may adjust the pedal load of the pedals 22 by adjusting the amount of electric power charged in the battery 23 after being generated from the generator 21 in accordance with driving of the pedals 22. Under the condition that pedal load is applied to the pedals 22, the pedals 22 are rotated only when the user strongly pedals the pedals 22 and, as such, the user may feel pedaling sensation when pedaling the pedals 22.

Also, the pedal load controller 70 releases the pedal load applied to the pedals 22 by opening both output terminals of the generator 21. When the pedal load applied to the pedals 22 is released, it is possible to rapidly move each pedal 22 to a desired position, using small force, because the pedal 22 is easily rotatable.

Figure 4:
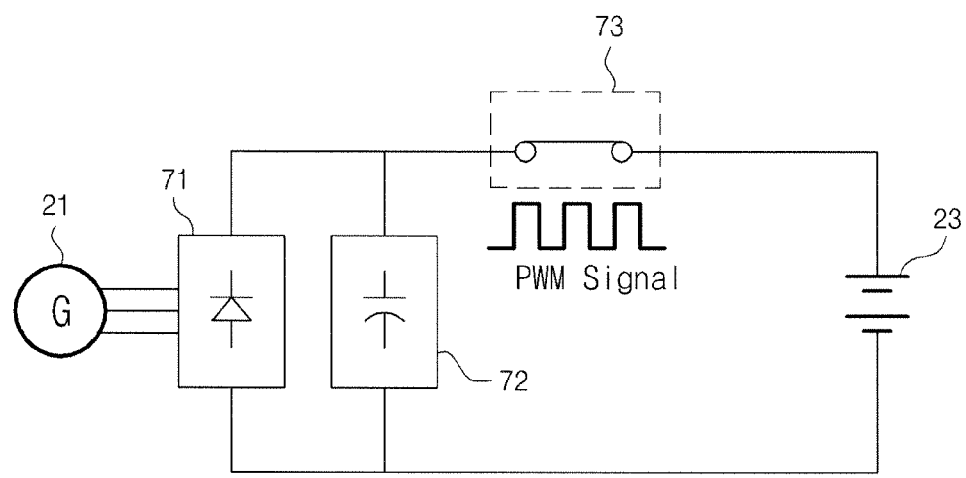
FIG. 4 is a circuit diagram explaining operation of the pedal load controller in the electric bicycle according to the illustrated embodiment of the present invention when the rotation direction of the pedals is a normal direction.

FIG. 4 is a circuit diagram explaining operation of the pedal load controller in the electric bicycle according to the illustrated embodiment of the present invention when the rotation direction of the pedals is a normal direction.

Referring to FIG. 4, the electronic control unit 40 applies pedal load to the pedals 22 through the pedal load controller 70 when the user pedals the pedals 22 to rotate the pedals 22 in the normal direction.

In more detail, the electronic control unit 40 first performs pulse width modulation (PWM) control for the switch 73, for application of pedal load to the pedals 22. When the switch 72 is PWM-controlled, electric power generated form the generator 21 in accordance with operation of the pedals 22 is charged in the battery 23. At the same time, in accordance with the operation of the generator 21, the user feels pedaling sensation when pedaling the pedals 22. That is, when a power circuit connected to the generator 21 forms a closed loop, counter electromotive force is generated, thereby generating pedal load. When the pedal load generated as described above is applied to the pedals 22, the pedals 22 are rotated only when the user strongly pedals the pedals 22 and, as such, the user feels pedaling sensation when pedaling the pedals 22.

Figure 5:
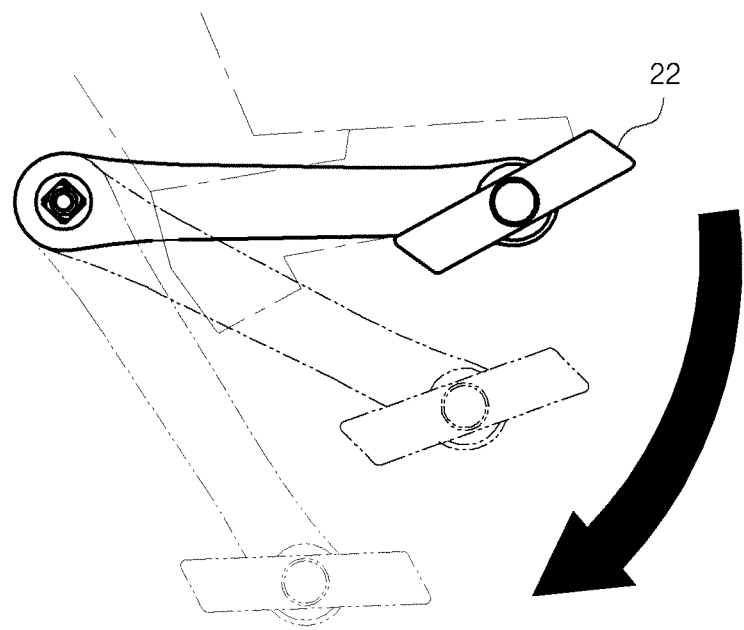
FIG. 5 is a schematic view explaining pedal rotating force when the pedal rotation direction is the normal direction, in the electric bicycle according to the illustrated embodiment of the present invention.

FIG. 5 is a schematic view explaining pedal rotating force when the pedal rotation direction is the normal direction, in the electric bicycle according to the illustrated embodiment of the present invention.

Referring to FIG. 5, when the rotation direction of the pedals 22 is the normal direction, the user feels relatively-high pedaling sensation corresponding to a magnitude as indicated by an arrow in FIG. 5.

Figure 6:
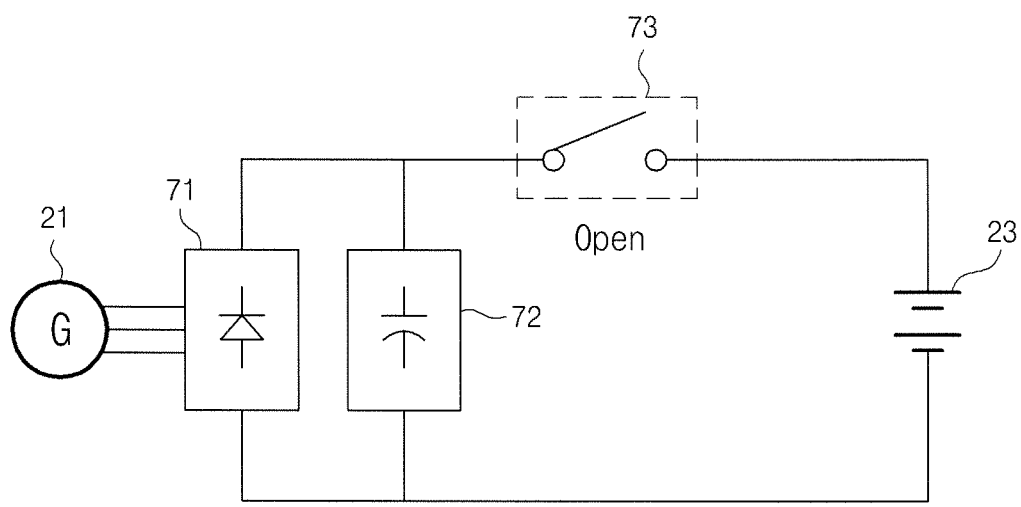
FIG. 6 is a circuit diagram explaining operation of the pedal load controller when the pedal rotation direction is the reverse direction, in the electric bicycle according to the illustrated embodiment of the present invention.

FIG. 6 is a circuit diagram explaining operation of the pedal load controller when the pedal rotation direction is the reverse direction, in the electric bicycle according to the illustrated embodiment of the present invention.

Referring to FIG. 6, the electronic control unit 40 releases the pedal load applied to the pedals 22 by the pedal load controller 70 when the rotation direction of the pedals 22 is the reverse direction.

In more detail, the electronic control unit 40 turns off the switch 73, to open the switch 73, and thus to release the pedal load applied to the pedals 22.

When the switch 73 is opened, both the output terminals of the generator 21 are opened, thereby causing the pedal load applied to the pedals 22 to be released. In this case, the user feels that the pedals 22 rotate idle. That is, when the power circuit connected to the generator 21 does not form a close loop, no counter electromotive force is generated. Thus, the pedal load is released. In this case, the user may easily step the pedals 22 to rotate the pedals 22. Accordingly, it may be possible to rapidly move each pedal 22 to a desired position, using small force.

Figure 7:
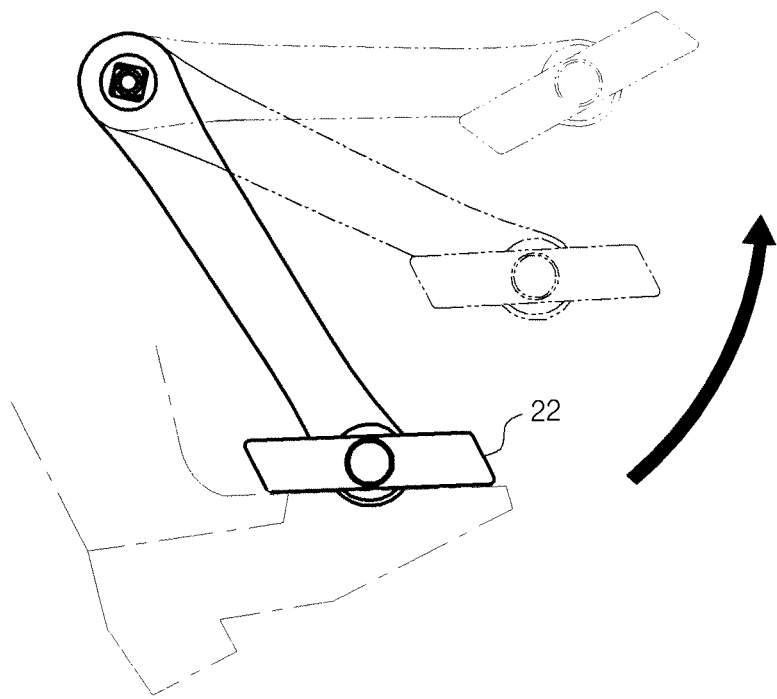
FIG. 7 is a schematic view explaining pedal rotating force when the pedal rotation direction is the reverse direction, in the electric bicycle according to the illustrated embodiment of the present invention.

FIG. 7 is a schematic view explaining pedal rotating force when the pedal rotation direction is the reverse direction, in the electric bicycle according to the illustrated embodiment of the present invention.

Referring to FIG. 7, when the rotation direction of the pedals 22 is the reverse direction, the user feels relatively-low pedaling sensation corresponding to a magnitude as indicated by an arrow in FIG. 7.

Again referring to FIG. 2, the speed controller 80 adjusts a rotation speed of the motor 25. The speed controller 80 adjusts the rotation speed of the motor 25 by changing the number of poles of the motor 25 or varying the frequency of electric power supplied to the motor 25.

The electronic control unit 40 senses the rotation direction of the pedals 22 through the direction sensor 60. When the sensed rotation direction of the pedals 22 is the reverse direction, the electronic control unit 40 releases the load applied to the pedals 22 by the pedal load controller 27. For example, the electronic control unit 40 applies the pedal load to the pedals 22 when the rotation direction of the pedals 22 is the normal direction, whereas the electronic control unit 40 releases the pedal load applied to the pedals 22 when the rotation direction of the pedals 22 is the reverse direction.

Figure 8:
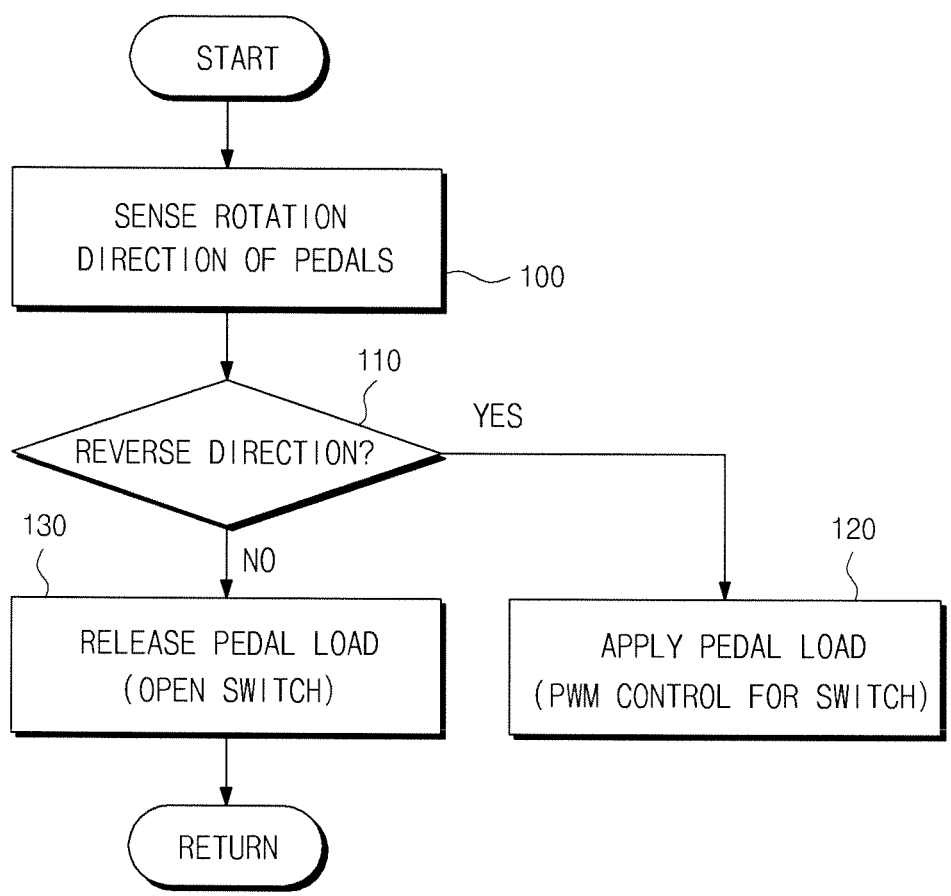
FIG. 8 is a flowchart illustrating a control method of the electric bicycle according to an embodiment of the present invention.

FIG. 8 is a flowchart illustrating a control method of the electric bicycle according to an embodiment of the present invention.

Referring to FIG. 8, the electronic control unit 40 senses the rotation direction of the pedals 22 through the direction sensor 60 (100).

After sensing the rotation direction of the pedals 22, the electronic control unit 40 determines whether the sensed rotation direction of the pedals 22 is the reverse direction (110).

When it is determined, based on the result of the determination executed in the operation 110, that the rotation direction of the pedals 22 is the normal direction, the electronic control unit 40 applies pedal load to the pedals 22 through the pedal load controller 70, to cause the user to feel pedaling sensation (120). That is, the electronic control unit 40 performs PWM control for the switch 73 connected in series between the battery 23 and the generator 21, to charge the battery 23 with electric power generated from the generator 21, and thus to apply pedal load to the pedals 22.

On the other hand, when it is determined, based on the result of the determination executed in the operation 110, that the rotation direction of the pedals 22 is the reverse direction, the electronic control unit 40 releases the pedal load applied to the pedals 22 through the pedal load controller 70, to enable the user to rapidly rotate the pedals 22 with small force without feeling pedaling sensation (130). That is, the electronic control unit 40 opens the switch 73, to open the output terminals of the generator 21, and thus to release the pedal load applied to the pedals 22.

Figure 9:
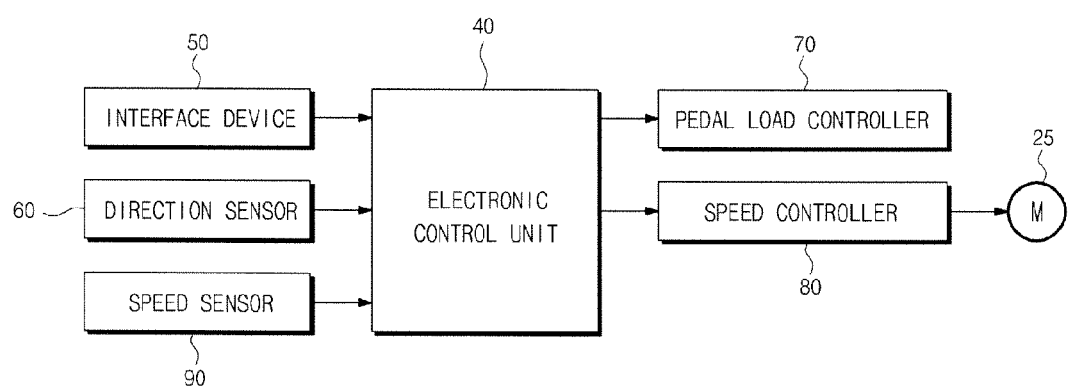
FIG. 9 is a block diagram illustrating a control configuration of the electric bicycle according to another embodiment of the present invention.

FIG. 9 is a block diagram illustrating a control configuration of the electric bicycle according to another embodiment of the present invention. In FIG. 9, the same constituent elements as those of FIG. 2 will be designated by the same reference numerals.

Referring to FIG. 9, the electric bicycle includes an electronic control unit 40, an interface device 50, a direction sensor 60, a pedal load controller 70, a speed controller 80, and a speed sensor 90.

The speed sensor 90 senses the speed of the bicycle. The speed sensor may be, for example, a wheel speed sensor to sense the wheel speed of the front wheel.

The electronic control unit 40 senses the rotation direction of the pedals 22 through the direction sensor 60 when the speed of the electric bicycle is equal to or lower than a predetermined speed. When the sensed rotation direction of the pedals 22 is a reverse direction, the electronic control unit 40 releases pedal load applied to the pedals 22 by the pedal load controller 70.

On the other hand, when the rotation direction of the pedals 22 is a normal direction under the condition that the speed of the electric bicycle is equal to or lower than the predetermined speed, the electronic control unit 40 applies pedal load to the pedals 22.

Upon starting the bicycle, the user moves each pedal 22 to a desired start position. In this case, typically, the user rotates the pedals in the reverse direction by the tops of the feet, and then pedals the pedals 22 in the normal direction, to travel the electric bicycle.

In this embodiment, when the user rotates the pedals 22 in the reverse direction upon starting the electric bicycle from a stopped state thereof, pedaling sensation is provided to the user. Accordingly, it may be possible to move each pedal 22 to a start position thereof with small force.

Meanwhile, when it is desired to again accelerate the electric bicycle during travel thereof in a state in which each pedal 22 is not positioned at the start position thereof, it is necessary to move the pedal 22 to the start position. In this case, it may be possible to rapidly move the pedal 22 to the start position with small force by rotating the pedal 22 to the start position in the reverse direction, and thus releasing the stepping load applied to the pedal 22.

Figure 10:
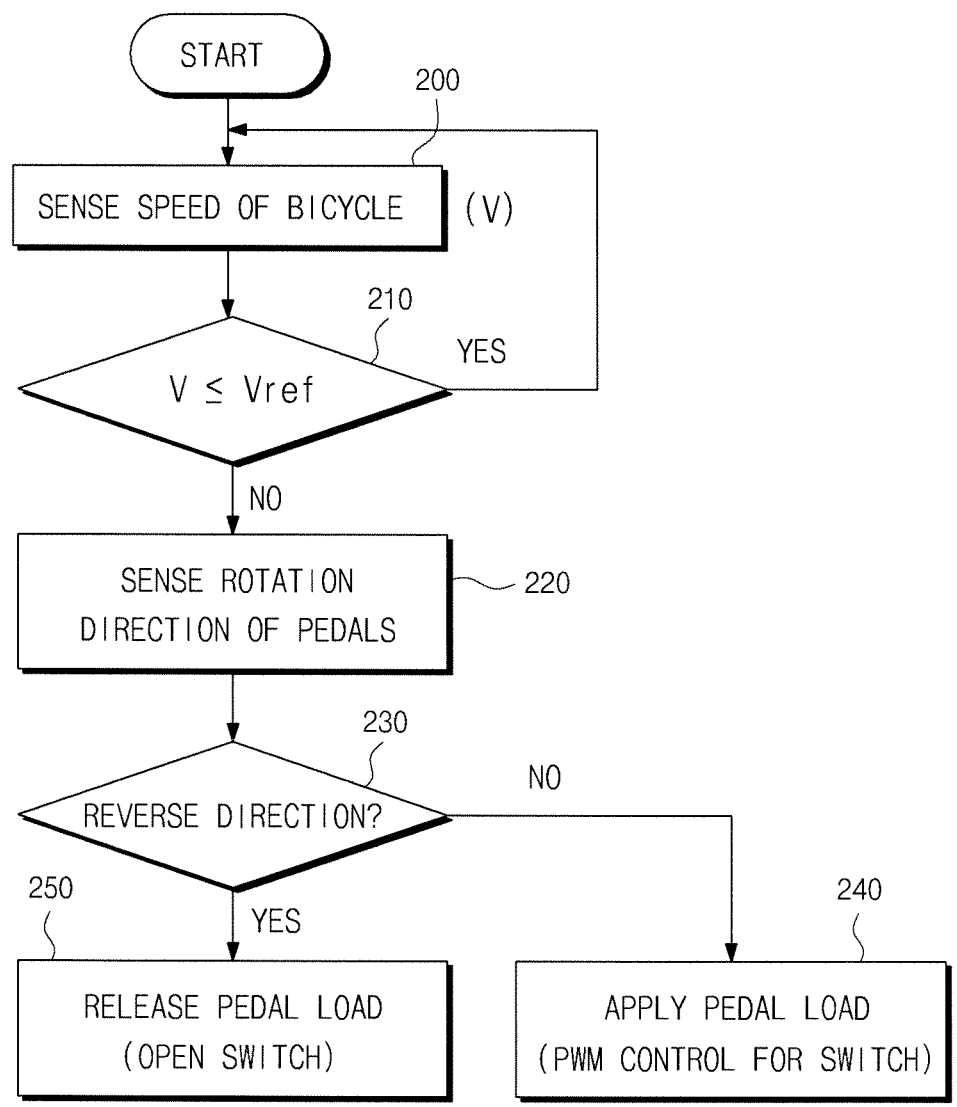
FIG. 10 is a flowchart illustrating a control method of the electric bicycle according to another embodiment of the present invention.

FIG. 10 is a flowchart illustrating a control method of the electric bicycle according to another embodiment of the present invention.

Referring to FIG. 10, the electronic control unit 40 senses the speed of the electric bicycle through the speed sensor 90 (200).

After sensing the speed of the electric bicycle, the electronic control unit 40 determines whether the sensed speed V of the electric bicycle is equal to or lower than a predetermined speed Vref (210).

When it is determined, based on the result of the determination executed in the operation 210, that the sensed speed V of the electric bicycle exceeds the predetermined speed Vref, the electronic control unit 40 returns to operation 200.

On the other hand, when the sensed speed V of the electric bicycle is equal to or lower than the predetermined speed Vref, the electronic control unit 40 senses the rotation direction of the pedals 22 through the direction sensor 60.

Based on the sensed result, the electronic control unit 40 determines whether the sensed rotation direction of the pedals 22 is a reverse direction (230).

When it is determined, based on the result of the determination executed in the operation 230, that the rotation direction of the pedals 22 is a normal direction, the electronic control unit 40 applies pedal load to the pedals 22 in order to cause the user to feel pedaling sensation (240). In this case, the electronic control unit 40 performs PWM control for the switch 73 connected in series between the battery 23 and the generator 21, to charge the battery 23 with electric power generated from the generator 21, and thus to apply pedal load to the pedals 22.

On the other hand, when it is determined, based on the result of the determination executed in the operation 110, that the rotation direction of the pedals 22 is the reverse direction, the electronic control unit 40 releases the pedal load applied to the pedals 22 through the pedal load controller 70, to enable the user to rapidly rotate the pedals 22 with small force without feeling pedaling sensation (250). In this case, the electronic control unit 40 opens the switch 73, to open the output terminals of the generator 21, and thus to release the pedal load applied to the pedals 22.

As apparent from the above description, in one aspect of the present invention, it may be possible to release pedal load when the pedals rotate in a reverse direction, and thus to reduce inconvenience occurring upon rotating the pedals in the reverse direction.

Also, in another aspect of the present invention, pedal load is applied when the rotation direction of the pedals is a normal direction, whereas the pedal load is released when the rotation direction of the pedals is a reverse direction. Accordingly, it may be possible to enable the user to feel pedaling sensation upon rotating the pedals in the normal direction. Also, it may be possible to enable the user to rapidly rotate the pedals with small force without feeling pedaling sensation upon rotating the pedals in the reverse direction.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A chainless electric bicycle comprising:
   a chainless wheel driven only by an electric motor in response to rotation of pedals;
   a direction sensor to sense a rotation direction of the pedals;
   a pedal load controller to adjust a load applied to the pedals to create for a rider a sensation of a drive chain when the rider is pedaling; and
   an electronic control unit configured to apply the load through the pedal load controller to the pedals when the sensed rotation direction is a normal direction and to release the load applied to the pedals through the pedal load controller when the sensed rotation direction is a reverse direction,
   wherein the pedal load controller comprises:
   a generator to generate AC power in accordance with driving of the pedals;
   a rectifier to rectify the AC power generated from the generator into DC power;
   a smoothing circuit to charge the DC power output from the rectifier so as to smooth the output power; and
   a switch connected in series between the generator and a battery to be charged with the power smoothed by the smoothing circuit,
   wherein the electronic control unit performs a pulse width modulation (PWM) control to turn on or off the switch when the sensed rotation direction of the pedals is the normal direction to charge the battery with the power generated from the generator and turns off the switch when the sensed rotation direction of the pedals is the reverse direction to open output terminals of the generator.

2. The chainless electric bicycle according to claim 1, further comprising:

a speed sensor to sense a speed of the electric bicycle, wherein under a condition that the speed sensed by the speed sensor is equal to or lower than a predetermined speed, the electronic control unit applies the load to the pedals through the pedal load controller when the sensed rotation direction is the normal direction, while releasing the load applied to the pedals by the pedal load controller when the sensed rotation direction is the reverse direction.

3. A control method of a chainless electric bicycle having a chainless wheel which is driven only by an electric motor in response to rotation of pedals, the method comprising:

sensing a rotation direction of the pedals;

applying a load to the pedals to create for a rider a sensation of a drive chain when the rider is pedaling and the sensed rotation direction is a normal direction by performing a pulse width modulation (PWM) control to turn on or off a switch such that charged with power generated from a generator; and releasing the load applied to the pedals when the sensed rotation direction is a reverse direction by turning off the switch such that output terminals of the generator are open, wherein the bicycle comprises a direction sensor to sense the rotation direction the pedals, a pedal load controller including the generator to generate AC power in accordance with driving of the pedals, a rectifier to rectify the AC power generated from the into DC power, a smoothing circuit to charge the DC power output from the rectifier so as to smooth the output power, and the switch connected in series between the generator and the battery to be charged with the output power smoothed by the smoothing circuit to adjust the load applied to the pedals to create for the rider the sensation of the drive chain when the rider pedals, and an electronic control unit configured to apply the load through the pedal load controller to the pedals when the sensed rotation direction is the normal direction and to release the load applied to the pedals through the pedal load controller when the sensed rotation direction is the reverse direction.

4. The control method according to claim 3, further comprising:

sensing a speed of the electric bicycle; and applying the load to the pedals when the sensed rotation direction is a normal direction, under a condition that the sensed speed is equal to or lower than a predetermined speed while releasing the load applied to the pedals by the pedal load controller when the sensed rotation direction is the reverse direction.

\* \* \* \* \*